(12) United States Patent
Reybrouck et al.

(10) Patent No.: US 10,518,600 B2
(45) Date of Patent: Dec. 31, 2019

(54) WHEEL SUSPENSION

(71) Applicant: Reybrouck Consulting & Innovation BVBA, Etterbeek (BE)

(72) Inventors: Koenraad Gerald Rijkaard Lode Reybrouck, Etterbeek (BE); Shi Yan, Sint-Stevens-Woluwe (BE)

(73) Assignee: Reybrouck Consulting & Innovation BVBA, Etterbeek (BE)

( * ) Notice: Subject to any disclaimer, the term of this patent is extended or adjusted under 35 U.S.C. 154(b) by 95 days.

(21) Appl. No.: 15/515,087

(22) PCT Filed: Oct. 7, 2015

(86) PCT No.: PCT/BE2015/000048
§ 371 (c)(1),
(2) Date: Mar. 28, 2017

(87) PCT Pub. No.: WO2016/058060
PCT Pub. Date: Apr. 21, 2016

(65) Prior Publication Data
US 2017/0210192 A1    Jul. 27, 2017

(30) Foreign Application Priority Data
Oct. 14, 2014    (BE) .................................. 2014/5010

(51) Int. Cl.
*B60G 17/0165*    (2006.01)
*B60B 35/10*    (2006.01)
(Continued)

(52) U.S. Cl.
CPC .......... *B60G 17/0165* (2013.01); *B60B 35/10* (2013.01); *B60G 3/185* (2013.01);
(Continued)

(58) Field of Classification Search
CPC ................ B60G 7/003; B60G 17/0165; B60G 2206/111; B60G 2206/1116;
(Continued)

(56) References Cited

U.S. PATENT DOCUMENTS 3,264,009 A * 8/1966 Langendorf ........ B60B 35/1063
280/638
3,306,390 A * 2/1967 Jamme .................. B60B 35/001
180/209
(Continued)

FOREIGN PATENT DOCUMENTS

DE    69520682 T2    11/2001
DE    10045956 A1    3/2002
(Continued)

*Primary Examiner* — Barry Gooden, Jr.
(74) *Attorney, Agent, or Firm* — Rudy J. Ng; Bret E. Field; Bozicevic, Field & Francis LLP

(57) ABSTRACT

Wheel suspension comprising a frame suitable for connection to a body of a vehicle and comprising a first and second wheel which together define a track width, and wherein the first wheel is connected to the frame via a first set of actuators and wherein the second wheel is connected to the frame via a second set of actuators such that by means of operating the actuators the track width is adjustable between a narrow track, characterized in that the first set of actuators overlaps in the transverse direction of the vehicle with the second set of actuators.

12 Claims, 3 Drawing Sheets

US 10,518,600 B2
Page 2

(51) Int. Cl.
*B60G 7/00* (2006.01)
*B60G 17/0195* (2006.01)
*B60G 3/18* (2006.01)
*B60G 3/28* (2006.01)
*B62D 7/18* (2006.01)

(52) U.S. Cl.
CPC .............. *B60G 3/28* (2013.01); *B60G 7/003* (2013.01); *B60G 17/0195* (2013.01); *B62D 7/18* (2013.01)

(58) Field of Classification Search
CPC . B60G 2300/40; B60B 35/10; B60B 35/1036; B60B 35/1045; B60B 35/1054; B60B 35/1063; B60B 35/1072
See application file for complete search history.

(56) References Cited

U.S. PATENT DOCUMENTS

| | | | | |
|---|---|---|---|---|
| 3,899,037 A * | 8/1975 | Yuker | .............. | B60G 17/01925 180/41 |
| 4,109,747 A * | 8/1978 | Homagold | ............ | B60B 35/003 180/403 |
| 5,039,129 A * | 8/1991 | Balmer | .................... | B60G 3/04 180/209 |
| 5,282,644 A * | 2/1994 | Larson | ................. | B60B 35/001 180/209 |
| 5,489,113 A * | 2/1996 | Torborg | ................ | B60B 35/003 180/209 |
| 6,199,769 B1 | 3/2001 | Weddle | | |
| 6,206,125 B1 * | 3/2001 | Weddle | ................. | B60B 35/001 180/209 |
| 6,293,561 B1 * | 9/2001 | Goetzen | ................... | B60G 3/01 280/5.5 |
| 6,827,176 B2 * | 12/2004 | Bean | ..................... | B60B 35/003 180/411 |
| 7,163,227 B1 * | 1/2007 | Burns | ................. | B60B 35/1054 180/906 |
| 7,780,197 B2 * | 8/2010 | White | ....................... | B60G 9/02 280/781 |
| 8,376,078 B2 * | 2/2013 | Hiddema | ............. | A01C 23/008 180/209 |
| 8,746,388 B2 * | 6/2014 | Budweil | ............. | B60B 35/1063 180/209 |
| 9,156,312 B1 * | 10/2015 | Ruggeri | .................. | B60B 35/16 |
| 9,180,747 B2 * | 11/2015 | Slawson | .................. | B60G 3/01 |
| 9,527,536 B1 * | 12/2016 | Giesmann | .......... | B62D 49/0678 |
| 10,004,171 B2 * | 6/2018 | Ballu | ............. | B62D 7/1509 |
| 2004/0129491 A1 * | 7/2004 | Bean | ..................... | B60B 35/003 180/411 |
| 2006/0170171 A1 * | 8/2006 | Pedersen | .............. | B60G 21/007 280/62 |
| 2006/0289220 A1 * | 12/2006 | Oota | ....................... | B60R 21/02 180/274 |
| 2007/0164583 A1 * | 7/2007 | Jong | ...................... | B62D 39/00 296/187.03 |
| 2008/0073138 A1 * | 3/2008 | Asogawa | .............. | B60B 35/1063 180/209 |
| 2008/0190682 A1 * | 8/2008 | Mahy | ..................... | A61G 5/046 180/209 |
| 2010/0023213 A1 * | 1/2010 | Mizuno | .................... | B60G 3/26 701/37 |
| 2010/0075727 A1 * | 3/2010 | Coers | ...................... | A01D 41/12 460/150 |
| 2011/0133416 A1 * | 6/2011 | Hiddema | ............. | A01C 23/008 280/5.508 |
| 2011/0148053 A1 * | 6/2011 | Motebennur | .......... | B60G 9/00 280/6.16 |
| 2013/0062133 A1 * | 3/2013 | Budweil | ............. | B60B 35/1063 180/209 |
| 2013/0197756 A1 * | 8/2013 | Ramirez Ruiz | ........ | B60G 7/003 701/40 |
| 2014/0224555 A1 * | 8/2014 | Qian | .................... | B62D 55/084 180/9.48 |
| 2014/0262587 A1 * | 9/2014 | Horner | .................. | B60R 21/013 180/274 |
| 2014/0327221 A1 * | 11/2014 | Berry | ....................... | B60G 3/02 280/124.128 |
| 2015/0137471 A1 * | 5/2015 | Smith | ....................... | B62D 7/16 280/93.502 |
| 2015/0210115 A1 * | 7/2015 | David | ....................... | B60B 35/10 301/128 |
| 2016/0009135 A1 * | 1/2016 | Jong | ........................ | B60B 35/10 280/5.52 |
| 2016/0144891 A1 * | 5/2016 | Reubens | .................. | B62D 7/18 280/93.512 |
| 2016/0176231 A1 * | 6/2016 | Daffue | .................... | A01B 51/00 280/86.75 |
| 2016/0227698 A1 * | 8/2016 | Ballu | .................... | B62D 7/1509 |
| 2017/0203628 A1 * | 7/2017 | Dames | .............. | B60G 17/0165 |
| 2018/0333987 A1 * | 11/2018 | Ratcliffe | ................. | B66F 9/065 |
| 2019/0039430 A1 * | 2/2019 | Crook | ................. | B60B 35/1054 |
| 2019/0275834 A1 * | 9/2019 | Budweil | ............. | B62D 31/003 |

FOREIGN PATENT DOCUMENTS

| | | |
|---|---|---|
| EP | 2058154 A1 | 5/2009 |
| EP | 2168786 A2 | 3/2010 |
| JP | H06286447 A | 10/1994 |
| JP | 2004168092 A | 6/2004 |
| JP | 2005047316 A | 2/2005 |
| WO | WO2008155587 A2 | 12/2008 |
| WO | WO2010020607 A1 | 2/2010 |

\* cited by examiner

WHEEL SUSPENSION

The present invention relates to a wheel suspension for a vehicle. The invention relates particularly to a wheel suspension, the track width of which is adjustable between a narrow track and a wide track. The wheel suspension of the invention is intended here to be suitable for passenger vehicles.

There has already been much discussion about vehicles with a variable track width. Such vehicles take up less space during parking because they can be set in the narrow track position for parking purposes. On long and substantially straight routes such vehicles also take up less space so that traffic can be organized with closer density since such substantially straight routes can be driven in the narrow track position. When the route becomes winding or when for whatever reason more stability of the vehicle is required, the vehicle can be set in the wide track position. The vehicle base, and also the surface area of the vehicle, are hereby enlarged, whereby the stability of the vehicle also increases appreciably. A vehicle is hereby obtained which has the property of being very stable and the property of being very compact, whereby the properties of the vehicle can be selected subject to conditions. The advantages of a motorcycle are thus combined with the advantage of a passenger car.

Despite the many advantages of a vehicle with an adjustable track width being known, a vehicle with a variable track width has yet to be commercialized successfully on a large scale. US 2003/0136592 describes a suspension with variable track width developed for caterpillar vehicles.

This suspension does not however allow independent spring-mounting and/or damping of the wheels because the wheel suspension is not independent. Such a suspension will not therefore be suitable for application in passenger vehicles.

EP 2 641 860 describes an independent wheel suspension wherein the track width is adjustable. The advantage of the wheel suspension proposed in EP 2 641 860 is that a favourable ratio of narrow track and wide track can be obtained. This is the result of the actuators which are connected rotatably as well as extendably to the frame of the vehicle. The combination of rotational movement and linear movement of the actuators which support the wheels is however complex such that large-scale application in a safe and operationally reliable manner is substantially impossible. Such a suspension is unsuitable particularly for passenger cars, which can reach relatively high speeds.

It is an object of the invention to propose a wheel suspension with a favourable variable track width which allows independent suspension and spring-mounting of the wheels and which can be applied on large scale in an economic manner.

The invention provides for this purpose a wheel suspension suitable for connection to a body of the vehicle and comprising a first and a second wheel which together define a track width and wherein the first wheel is provided so as to be connected to the body via a first set of actuators and wherein the second wheel is provided so as to be connected to the body via a second set of actuators such that by means of operating the actuators the track width is adjustable between a narrow track and a wide track, characterized in that the first set of actuators overlaps in the transverse direction of the vehicle with the second set of actuators.

Having the actuators overlap in the transverse direction of the vehicle achieves the effect in the first instance that the ratio of narrow track relative to wide track is considerably easier to optimize. According to the invention, because the actuators overlap at least partially in the transverse direction of the vehicle, a favourable ratio of narrow track and wide track can be obtained without a combination of linear and rotatable actuators being necessary. Only linear actuators can for instance thus be used which overlap each other in the transverse direction, wherein the overlap has a strongly positive effect on the ratio compared to a situation with similar actuators but without overlap.

A further effect of the overlap of the actuators is that the maximum spring travel increases considerably, particularly when the vehicle is in the narrow track position, and that undesired steering effects are considerably reduced. This is the result of the distance in the transverse direction of the vehicle between the location where the wheel is suspended and the location where the actuators are mounted on the vehicle. Because the actuators overlap each other in the transverse direction, the overall length of the actuators is greater as seen in the transverse direction of the vehicle than the distance between the wheels (track width). It is noted in this context that, the shorter the connecting elements between the wheel and the body, the less freedom of movement the wheel has (whereby maximum spring travel is small), and the greater the influence of steering of the wheel is on the position thereof. Because as a result of the overlap the connecting elements (formed by the actuators) are longer than in a conventional configuration (wherein overlap of the actuators is not implemented), the kinematic operation of the wheel is optimized. Kinematic operation here determines the behaviour of the suspension at low frequencies, while dynamic operation determines the behaviour at high frequencies.

It is noted here that the wheel suspension according to the invention comprises a first and a second set of actuators, and wherein a first wheel is suspended via a first set of actuators and a second wheel via the second set. An independent wheel suspension is hereby obtained wherein each wheel can move independently relative to the body of the vehicle. This allows all advantages of known independent wheel suspensions (such as MacPherson suspension and double wishbone suspension) to be implemented on the wheel suspension of the invention.

Each actuator of the first set of actuators and of the second set of actuators is preferably connected to the body. By connecting the actuators pivotally to the body only linear forces are transmitted via the actuators. The pivoting connection can for instance be formed via a ball joint. So-called rubber bushings are preferably used as generally known in the field of suspensions. Actuators are typically highly suitable for absorbing and transmitting linear forces, whereby the actuators can be used optimally in the preferred embodiment. A pivoting suspension of the actuators on the body further allows a dynamic operation of the wheel.

Each actuator of the first set of actuators and of the second set of actuators is preferably a linear actuator. An example of a linear actuator is a hydraulic cylinder or an electromechanical cylinder. Linear actuators are highly suitable for absorbing and transmitting linear forces. Linear actuators further allow changes to the length of the actuator such that the track width can be changed between a narrow track and a wide track.

Each actuator of the first set of actuators is preferably connected pivotally at the position of the first wheel to a first knuckle, and each actuator of the second set of actuators is connected pivotally at the position of a second wheel to a second knuckle. By hanging the wheel from a knuckle and connecting each knuckle via a set of actuators to the body of the vehicle, wherein each actuator is pivotally connected to the knuckle, an independent wheel suspension is obtained. Such an independent wheel suspension is similar to a double wishbone suspension, wherein the camber and steering position of the wheel are determined by the position of the knuckle.

Each set of the first set of actuators and second set of actuators preferably comprises at least a lower actuator and an upper actuator which extend substantially parallel and which are preferably connected at the position of the wheel respectively in a zone below and above the wheel axle. By providing a lower and upper suspension element extending between the body of the vehicle and the knuckle, similarly to a double wishbone suspension, the camber position of the wheel can be kept optimal at any position of the suspension. Because the lower and upper connections are formed by actuators (which can retract and extend), it is even possible to implement an active camber control. The road holding of the vehicle, particularly when negotiating a bend, can hereby be considerably improved. Active camber control is applied in practice only on super sports cars because active camber control via a conventional suspension is highly expensive and complex. With the wheel suspension according to the invention active camber control becomes simple and inexpensive to realize together with a variable track width. It is noted in this context that having an upper and lower actuator is sufficient to control camber. Preferably however, the upper actuator will be connected at the position of the knuckle in a zone above the wheel axle, and the lower actuator will be connected at the position of the knuckle in a zone below the wheel axle. The transfer of forces is in this way optimized. In the case of special suspensions, for instance for a solar vehicle, wherein a knuckle has a particular design, this is not the case and lower and upper actuator can both be mounted above the wheel axle. The terms lower and upper are used in relative sense to each other here.

Each set of the first set of actuators and second set of actuators preferably further comprises a steering actuator which extends substantially parallel to the upper and lower actuator and which is connected at the position of the wheel in a zone in front of or behind the wheel axle as seen in the direction of travel. Providing an actuator in front of or behind the wheel axle enables the angular position of the wheel to be changed by displacing and/or operating the steering actuator. The vehicle can be implemented here with a passive steering (steering which is connected to the steering wheel and with which the driver can steer normally), wherein the steering actuators are connected at the position of the frame to a reciprocally movable steering element so as to thus determine the steering angle of the wheels. Alternatively or in combination with the passive steering, an active steering can also be implemented in simple manner by operating the steering actuator. When a vehicle according to the invention is provided with the wheel suspension of the invention on both the front and rear sides, four-wheel steering can also be obtained in simple manner. In four-wheel steering it is known to have the rear wheels steer counter to the front wheels at low speed in order to thus reduce the turning circle. At high speed the rear wheels co-steer with the front wheels in order to increase stability. This can be implemented in very simple manner with the wheel suspension according to the invention by controlling the actuators. It will be apparent in this context that a wheel can also be steered by operating the lower and upper actuator relative to the steering actuator. It is the movement of the steering actuator relative to the upper and lower actuator which results in a steering of the wheel. The relative movement can be initiated here by the steering actuator or by the lower and/or upper actuator.

The actuators of the first set of actuators and the second set of actuators preferably have a substantially equal length when they are placed in the same position and the vehicle is travelling straight ahead. A balanced suspension is hereby obtained wherein the one wheel can be suspended and steered in the same manner as the other wheel, though completely independently of each other.

A central plane is preferably defined which extends upward and in the travel direction of the vehicle, and which central plane runs through the centre of gravity of the wheel suspension, wherein the first set of actuators and the second set of actuators are connected to the body asymmetrically relative to the central plane. This asymmetry appears in the first instance to be a drawback because the same force on the two wheels is transmitted in different ways to the body. Tests and simulations have however shown that the small differences in how forces are transmitted to the body of the vehicle do not outweigh the advantages resulting from the overlap of the actuators, being the reduction in the steering effects and the increase in the maximum spring travel. Actuators can alternatively be connected to the body of the vehicle and/or to the knuckle via an L-connection, wherein the short leg of the L is connected at the position of an end thereof to the body or knuckle and wherein the long leg of the L is connected parallel to the actuator such that the actuator is connected at a distance from its longitudinal axis to vehicle and/or knuckle. The connecting points to knuckle and/or vehicle can indeed hereby be placed wholly symmetrically, and actuators will still not come into collision with each other.

The suspension preferably further comprises a suspension strut for each wheel, which suspension strut is provided so as to control the vertical movement of the wheel relative to the body of the vehicle. Suspension struts are known and are applied for instance in MacPherson or double wishbone suspensions. The spring-mounting and damping of each wheel can be determined via the suspension strut. The suspension strut can be active or passive here. The suspension strut will influence the vertical movement of the wheel, while the actuators determine substantially the horizontal movements of the wheel. It is noted in this context that a suspension strut typically comprises a damper and a spring. The damper and the spring are not necessarily placed together here in a suspension. The damper can thus be mounted between knuckle and body of the vehicle while the spring is mounted between rod and body.

Each of the actuators of the first set of actuators and the second set of actuators preferably has a housing and an element slidable relative to the housing, and wherein the housings of actuators overlap each other substantially completely in the transverse direction of the vehicle. The ratio of narrow track and wide track is maximized by the substantially complete overlap of the housings of the actuators. The steering effects and suspension operation of the vehicle in the narrow track position are also optimized by the substantially complete overlap of the housings.

The wheel suspension preferably further comprises a control module which is provided so as to control the actuators on the basis of steering input and speed of the vehicle. On the basis of pre-programmed algorithms and/or conditions the control module can here set the actuators to narrow track position, wide track position or an intermediate position depending on the conditions in which the vehicle is used. The control module can also implement active steering and active camber control as described above.

The control module is preferably provided so as to be connected to a lateral crash detection sensor of the vehicle, and wherein the control module controls the actuators to the wide track position on the basis of the lateral crash detection sensor. Tests and simulations have shown that vehicles generally perform poorly in the case of a lateral impact. Particularly the absorption of the impact (in order to minimize the shock to a driver and/or passenger of the vehicle) is difficult in practice in the case of lateral collisions. Because the vehicle according to the invention has a wide track position, wherein the wide track is obtained by extending actuators, a lateral impact can be absorbed in simple manner by a vehicle with the wheel suspension of the invention using the actuators. Simulations and calculations made in this respect are very promising and show how it is possible to absorb a very great part of the lateral impact in the actuators such that the shock is minimized for driver and/or passenger of the vehicle. The safety of the vehicle is thus increased considerably. By placing lateral crash detection sensors on the vehicle and connecting them to the control module the advantage of absorption of the lateral impact by the actuators can be obtained even when the vehicle is (initially) in the narrow track position. In the narrow track position the control module will, in the case of an imminent impact, set the wheel suspension to the wide track position such that at the moment of impact the actuators can function as buffer for the impact. This enhances the safety of a vehicle with a wheel suspension according to the invention.

The invention will now be further described on the basis of an exemplary embodiment as shown in the drawing.

In the drawing.

The same or similar elements are designated in the drawing with the same reference numerals.

The invention relates to a wheel suspension for vehicles with variable track width. Vehicles with variable track widths can have three or more wheels. In a configuration with three wheels a single wheel will be placed at the front or rear while two wheels are then provided at a distance from each other at respectively the rear or front (the distance being in the transverse direction of the vehicle). These two wheels define a track width. The greater the track width, the wider the vehicle and the more stable the road holding. The greater the track width however, the more space the vehicle will take up. The narrower the track width, the narrower the vehicle and the less stable the road holding. The narrower the track width however, the less space the vehicle will take up. It will be apparent that other factors can also influence the stability of a vehicle.

The invention can further be applied to vehicles with four wheels. Most commercial passenger vehicles have four wheels. The foremost two of the four wheels are typically steerable here such that the direction of travel can be determined and the vehicle can be steered. Despite the fact that the invention is designed particularly for commercial passenger vehicles with three or four wheels, it will be apparent that the invention can likewise be applied to special purpose vehicles which are designed for a specific reason and can therefore have a specific number of wheels other than three or four wheels. The suspension according to the invention will be elucidated on the basis of an example of a vehicle with four wheels and with front wheel steering. On the basis of this description the skilled person will however be able to apply the wheel suspension in vehicles of other configuration. The invention is therefore not limited to a wheel suspension for a vehicle with four wheels.

Figure 1:
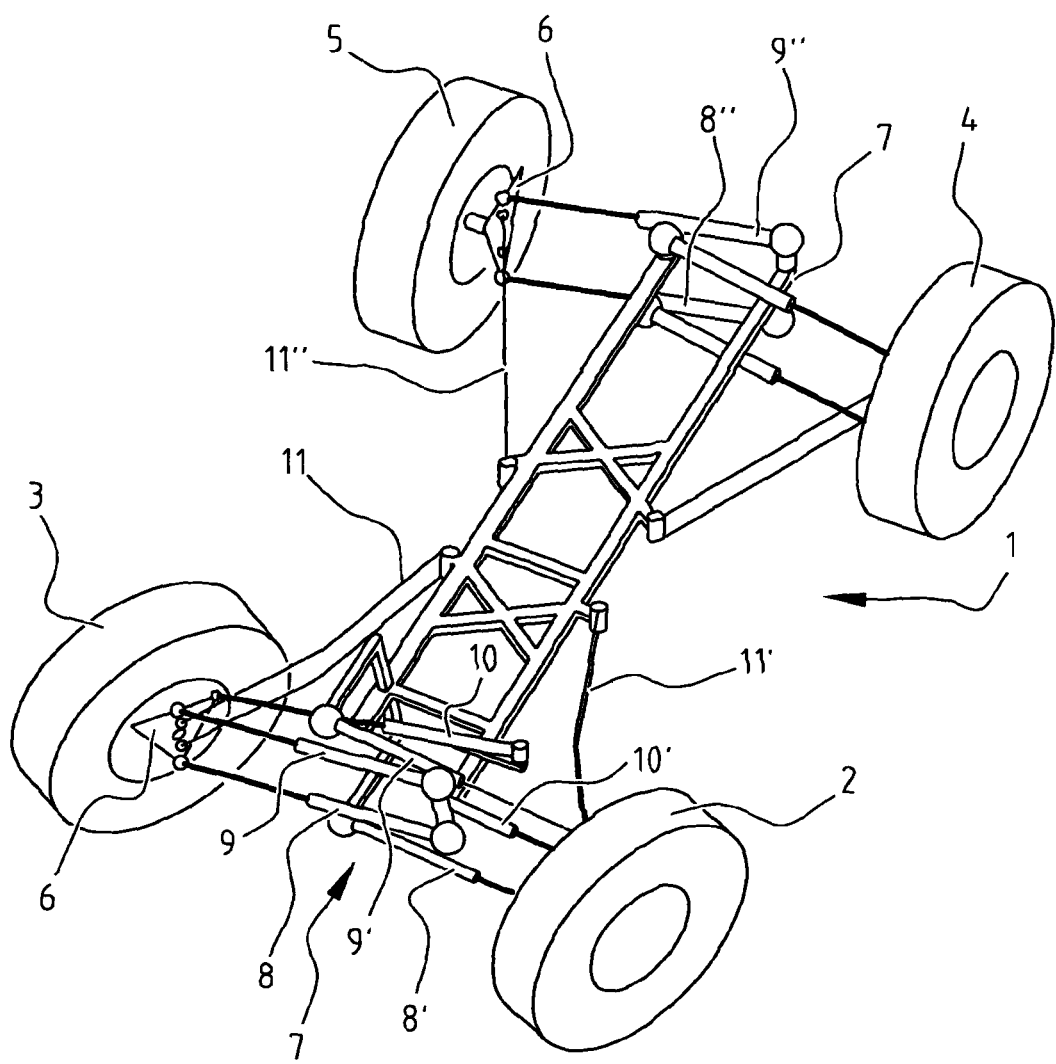
FIG. 1 shows a vehicle with a wheel suspension according to an embodiment of the invention at the front and rear.

FIG. 1 shows a vehicle 1 with two front wheels 2, 3 and two rear wheels 4, 5. In order to be able to show the different elements of the suspension properly only a basic structure of vehicle 1 is shown (which is not necessarily the support structure of the vehicle). Each of the wheels 2, 3, 4, 5 rotate around and axle connected to a knuckle 6. This knuckle can be provided with different elements, such as a brake system for the purpose of braking rotation of the wheel (for instance by means of a brake disc or brake drum), or an electric motor (for driving the vehicle). The knuckle is connected to a central frame 7 of the wheel suspension, wherein central frame 7 of the wheel suspension typically forms part of or is integrally formed with the body of the vehicle. Central frame 7, which will be used below for the clarity of the description, will in practice not therefore be present as such as separate element in the vehicle. The central frame can be formed integrally with the body of the vehicle. Central frame 7 can alternatively be formed separately however and connected to vehicle 1. Knuckles 6 can be connected here to frame 7 on the basis of different principles. Examples are the double wishbone principle or the MacPherson principle or other principles of independent wheel suspension.

FIG. 1 shows an example of how a knuckle 6 can be connected to a frame 7 in order to obtain an independent suspension of two wheels. FIG. 1 shows here a wheel suspension according to a first embodiment at the position of the front wheels of the vehicle and a wheel suspension according to a second embodiment, differing from the first embodiment, at the position of the rear wheels of the vehicle. On the basis of the explanation below and the accompanying figures the skilled person will appreciate that further variants can be developed on the basis of the same principles.

A wheel mounted on a vehicle will generally have three translational degrees of freedom and three rotational degrees of freedom. In order to mount the wheel such that the knuckle allows only an upward movement (for suspension of the vehicle), five of the six degrees of freedom must be predetermined. This is theoretically possible either by providing five connections between knuckle and vehicle, wherein each connection defines a degree of freedom, or by providing N fewer than five connections, but then providing N connections which block more than one degree of freedom. The present invention with the set of actuators can be embodied in accordance with these principles. The set of actuators preferably comprises five elements for blocking five of the six degrees of freedom. When however an element is provided for blocking multiple degrees of freedom, fewer elements can be used in the suspension.

Both the front wheels and the rear wheels of vehicle 1 of FIG. 1 are suspended on the basis of the double wishbone principle. In the context of this description double wishbone principle is defined here as a suspension principle wherein at least two transverse connections (in transverse direction of the vehicle), in particular an upper arm and a lower arm, extend between knuckle 6 and frame 7, and which transverse connections determine the camber position of the knuckle when the knuckle moves up and downward.

In the context of this description the MacPherson principle is defined as a suspension principle wherein only one transverse connection, in particular a lower arm, extends between knuckle 6 and frame 7 and wherein this one transverse connection determines together with the suspension strut the camber position of the knuckle when the knuckle moves up and downward. In a double wishbone suspension there can be a freer choice of placing of the suspension strut because the suspension strut does not determine (or does so to lesser extent) the camber position of the wheel during suspension (up and downward movement).

In the case of both the double wishbone and MacPherson suspensions a steering connection can further be provided in order to determine the steering position of the wheel. This steering connection also extends substantially in the transverse direction between knuckle 6 and frame 7. The steering connection is preferably connected at the position of knuckle 6 at the level of the wheel axle (so as to be subjected to the least possible influence by the camber position of the wheel).

The lower arm is preferably connected in a zone under the wheel axle. The upper arm, if present, is preferably connected in a zone above the wheel axle.

The wheel suspension of FIG. 1 is based on the double wishbone principle, i.e. each knuckle 6 is connected by means of a lower arm 8 and an upper arm 9 to frame 7. This is the case at the suspension of both front wheels 2,3 and rear wheels 4,5 of vehicle 1 of FIG. 1. Front wheels 2,3 further comprise a steering connection 10 between knuckle 6 and frame 7 which allows the knuckle to be steered (i.e. the steering position of the knuckle to be determined). Lower arm 8, upper arm 9 and optional steering arm 10 together form a set of actuators connecting knuckle 6 to frame 7. Together with suspension strut 14 and rod 11 the wheel is thus suspended by five elements so that five of the six degrees of freedom are predetermined. In FIG. 1 the actuators of right front wheel 3 are designated with reference numerals 8, 9 and 10. The actuators of left front wheel 2 are designated with reference numerals 8', 9' and 10'. The actuators of right rear wheel 5 are designated with reference numerals 8" and 9" (only two actuators are present in the wheel suspension of rear wheels 4,5, and one of the actuators, the suspension strut and rod 11 are provided here in order to block more than one degree of freedom).

Each actuator 8, 9, 10 is formed in the example of FIG. 1 as a linear actuator, more specifically a hydraulic or electromechanical cylinder. The cylinder has a housing and a piston here. The piston can be retracted into and extended from the housing by means of a hydraulic or electromechanical drive so as to thus change the length of actuator 8, 9, 10. The actuators are connected to frame 7 such that the actuators of a left wheel 2 overlap in the transverse direction of the vehicle with the actuators of a right wheel 3. This will be discussed in more detail below with reference to the following figures.

According to the embodiment shown in FIG. 1, each knuckle 6 is further connected to a central zone of the vehicle via a rod 11. In the embodiment of FIG. 1 rod 11 is embodied as double rod wherein two elongate elements 11 extend parallel between a central zone of vehicle 1 and knuckle 6. Rod 11 is connected pivotally to knuckle 6 and connected pivotally to the central zone of the vehicle. Rod 11 will hereby be able to absorb forces acting on the knuckle in the travel direction of the vehicle. Actuators 8, 9, 10 are hereby relieved of forces in the travel direction such that these actuators 8, 9, 10 must absorb only forces acting on the wheels in the transverse direction of the vehicle. When two rods 11 are provided as shown in FIG. 1, torque on the knuckle (for instance as a result of braking or driving of the wheel) can also be absorbed by rods 11.

Each knuckle is preferably further provided with a suspension strut (designated with reference numeral 14 in FIGS. 2 and 3) which is provided so as to determine the vertical movement of the wheel and to absorb the forces in the vertical direction. In the configuration of FIG. 1 the rods are provided in order to absorb torque round the wheel axle and forces in the longitudinal direction of the vehicle, the lower and upper actuators are provided so as to absorb camber torque and forces in the transverse direction of the vehicle, the steering actuator is provided so as to absorb steering torque and the suspension strut is provided so as to absorb forces in the upward direction. It will be apparent to the skilled person here that the actuators can be placed in practice such that the entirety of connections of the suspension blocks the degrees of freedom without it being possible to link each of the connections explicitly to one degree of freedom. It will thus be apparent in this context that operation of the steering actuator changes the steering position of the wheel. Operation of the lower and upper actuator will however also change the steering position when the steering actuator remains static. This demonstrates that everything is relative and depends on the position and/or movement of other connections of the wheel suspension.

Figure 2A:
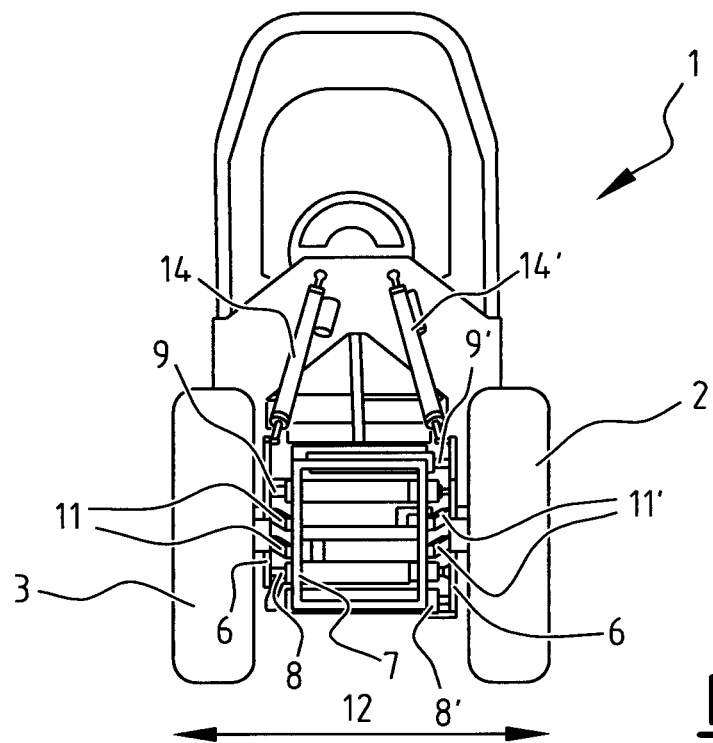
FIG. 2 is a front view of a vehicle with a wheel suspension according to an embodiment of the invention in the narrow track position and in the wide track position.
Figure 2B:
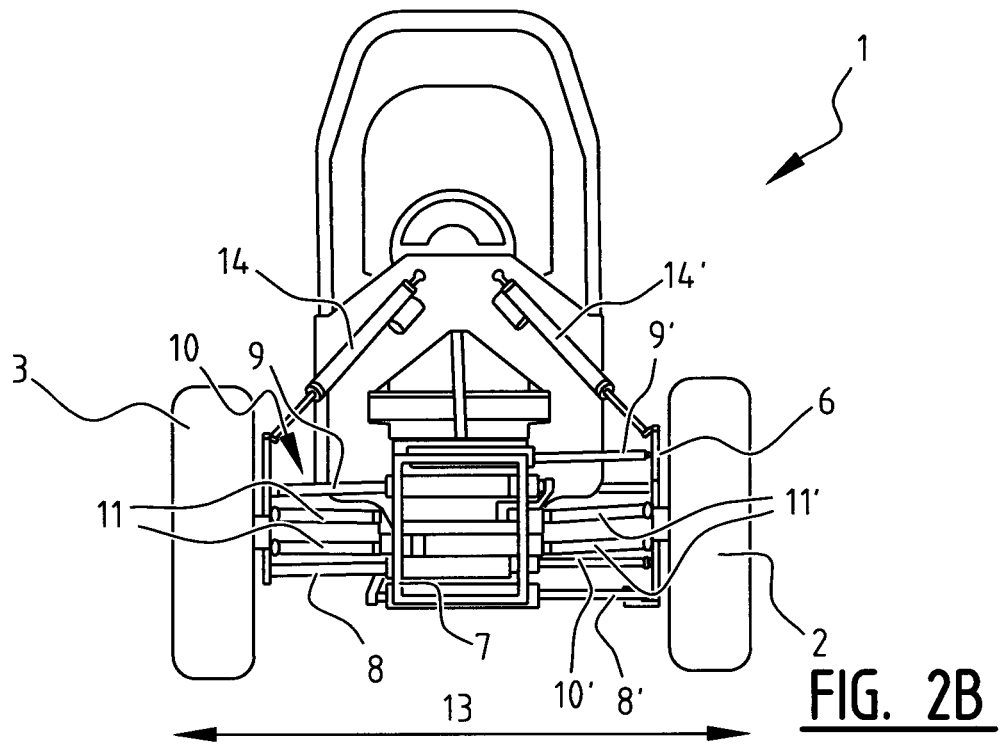

FIG. 2 shows a front view of a vehicle with a wheel suspension according to an embodiment of the invention. FIG. 2 shows here how the wheel suspension according to the invention allows adjustment of the track width of vehicle 1. In FIG. 2A the vehicle is shown with a narrow track width 12. In FIG. 2B vehicle 1 is shown with a wide track width 13.

In the narrow track position as shown in FIG. 2A, wherein vehicle 1 has a narrow track width, actuators 8, 9, 10 are substantially fully retracted. In the wide track position as shown in FIG. 2B, wherein vehicle 1 has a wide track width, actuators 8, 9, 10 are substantially fully extended. The skilled person will appreciate here that intermediate positions, wherein the vehicle has a track width lying between the shown narrow track position 12 and the wide track position 13, can also be taken up by only partially extending actuators 8, 9, 10.

FIG. 2 shows how actuators 8, 9, 10 overlap each other at least partially in the transverse direction of the vehicle (wherein the transverse direction of the vehicle is the direction running parallel to the ground surface and transversely of the (straight) direction of travel of vehicle 1). In the exemplary embodiment of FIG. 2, wherein actuators 8, 9, 10 are hydraulic or electromechanical cylinders with a housing and a piston, the housings of the actuators of the two wheels 2,3 overlap each other substantially completely. In another embodiment the actuators can also be mounted the other way round so that it is the pistons which overlap each other. Different effects are achieved by this overlap in the transverse direction which are elucidated below.

A first effect of the overlap in the transverse direction is that the ratio of narrow track and wide track becomes considerably more favourable. Where the theoretical maximum ratio of wide track/narrow track is conventionally (without overlap) 2/1, the theoretical maximum according to the invention is 3/1. This is because the housings of the actuators overlap each other. For purposes of this theoretical maximum the wheel width and the dimensions of the connecting elements are disregarded, which is impossible in practice. The maximum theoretical ratio of wide track/narrow track will therefore never be effectively achieved in practice, and the ratio will always be less favourable.

According to the principle of the invention a vehicle is designed with a wide track of 140 cm and a narrow track of 80 cm.

A second effect of the overlap is that, during up and downward movement of the vehicle, negative camber effects and steering effects are fewer (than in a similar situation without overlap). This is the result of the lengths of the transverse connections which become appreciably greater due to the overlap. In other words, the distance between the point at which actuator 8, 9, 10 is connected to frame 7 and the point at which actuator 8, 9, 10 is connected to knuckle 6 is sufficiently great to minimize negative camber and steering effects.

A third effect of the overlap is that there is a considerable increase in the scope for suspension, particularly in the narrow track position. This is likewise a result of the length in the transverse direction of the vehicle between the point at which actuator 8, 9, 10 is connected to frame 7 and the point at which actuator 8, 9, 10 is connected to knuckle 6. This distance determines the maximum spring travel (movement of the wheel in the upward and downward direction) which a wheel can cover. This allows a vehicle to be designed which can also be comfortably suspended in the narrow track position.

FIG. 2 further shows the suspension struts 14, 14'. Each wheel is provided with a suspension strut 14. The suspension strut extends between vehicle 1, in particular a zone of vehicle 1 located above frame 7, and knuckle 6 (or an actuator of the set of actuators). In an embodiment as shown in FIG. 2A suspension strut 14 is also formed here as an actuator. This allows suspension strut 14 to be retracted into the narrow track position and to be extended into the wide track position in order to maintain a constant travel height of the vehicle in the two positions (and so also in intermediate positions). If the suspension strut is not formed as actuator, the travel height in the narrow track position will become higher, which can also be perceived as agreeable by a driver. By connecting suspension struts 14 directly to knuckle 6 the actuators of the set (actuator 8, 9, 10) are relieved of vertical forces. Suspension strut 14 can alternatively be connected to a component of the set of actuators. The advantage hereof would be that the suspension strut does not have to be able to change in length in order to maintain a constant travel height of the vehicle. The drawback will however be that actuators 8, 9, 10 must then also bear vertical forces/bending moments and will therefore have to be given a stronger form. Suspension strut 14 can as further alternative be connected to rod 11.

It is noted in this context that it is not essential for suspension strut 14 to be embodied as one element wherein spring and damper are combined in a suspension strut. Spring and damper can also be provided separately. The spring can for instance be provided on rod 11 and the damper on the knuckle.

FIG. 2 further shows rods 11 which are connected to a central zone of vehicle 1 and which absorb the forces on knuckle 6 in the travel direction of vehicle 1. Actuators 8, 9, 10 are hereby relieved of forces in the travel direction. In combination with the suspension strut which relieves actuators 8, 9, 10 of forces in the upward direction, the actuators will have to absorb only transverse forces on the wheel. Since hydraulic or electromagnetic cylinders (just as most linear actuators) are highly suitable for absorbing forces in the longitudinal direction of the actuator, light and inexpensive actuators can be used for this purpose. This makes the application of the wheel suspension in an economic manner feasible in commercial vehicles. Rods 11 can optionally also be embodied as actuator. In combination with a suspension strut 14 embodied as actuator, the vehicle can theoretically be provided so as to climb steps, for instance in order to park the vehicle in the hallway of a house. The actuator-suspension strut would allow the wheel to be raised while the actuator-rod can move the wheel forward so as to thus negotiate a step.

Figure 3A:
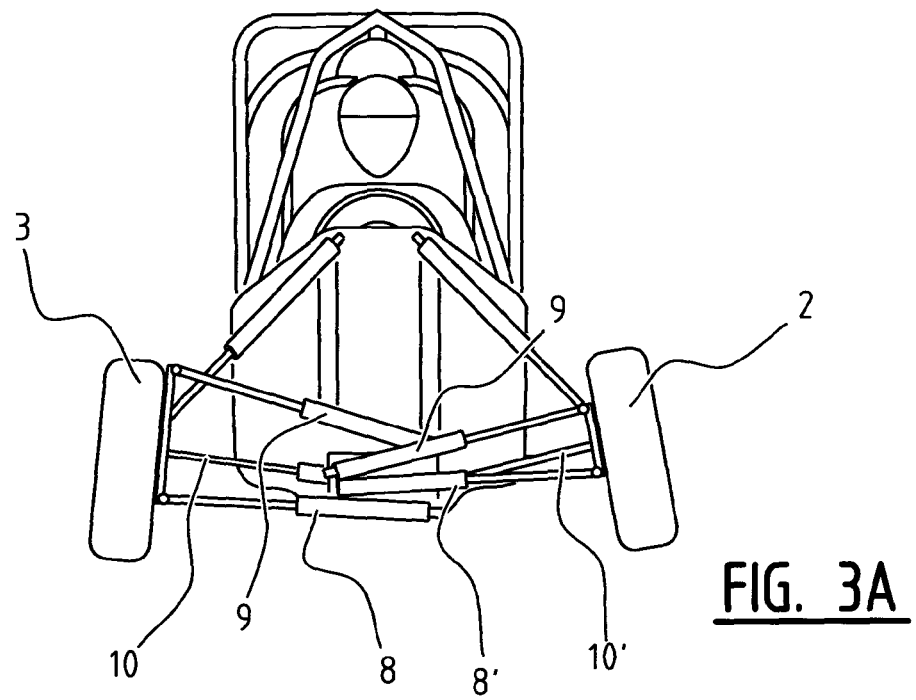
FIG. 3 is a front view of a vehicle with a wheel suspension according to an embodiment of the invention in different positions of the suspension.
Figure 3B:
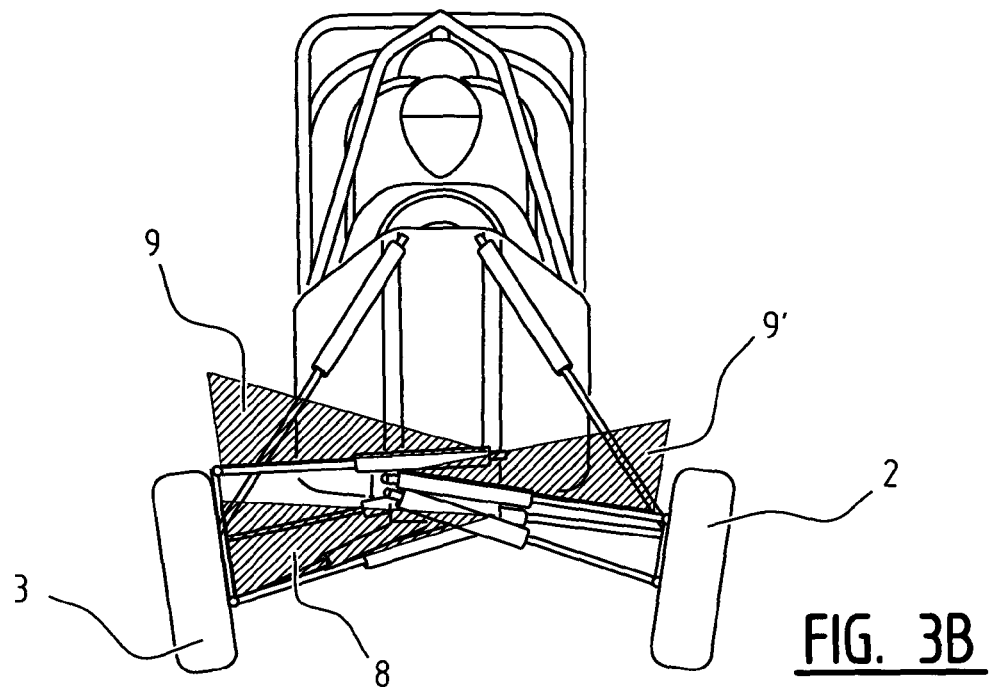

FIG. 3 shows a vehicle 1 with a wheel suspension according to an embodiment of the invention in the wide track position, wherein in FIG. 3A the suspension (formed by suspension struts 14) of the wheels is compressed to the maximum and wherein in FIG. 3B the suspension of the wheels is extended to the maximum. It will be apparent here that the terms compressed and extended are related to the vertical movement of the wheel. Vertical movement of the wheel during travel enables unevenness in the ground surface to be absorbed. The stability of vehicle 1 is thus greatly increased, particularly when vehicle 1 is travelling at a considerably high speed. It will be apparent here that, because of the independent suspension of each wheel 3, 4, the suspension will also operate independently. The maximum spring travel is determined by suspension struts 14 and can be optimized by the skilled person in accordance with the properties of vehicle 1 and the wheel suspension thereof. In addition to having a spring-mounting function, suspension strut 14 will typically also have a damping function.

During suspension (up and downward movement wherein the suspension strut is compressed or extended) of a wheel 3 the actuators 8, 9, 10 rotate around their connection point to frame 7. The skilled person will understand here that this movement is not a purely upward movement in practice because knuckle 6 is connected by means of rods 11 to a central zone of the vehicle. In the shown embodiment rods 11 have a fixed length and the suspension of the wheel will hereby have the result that the wheel is moved a little forward and/or rearward in order to maintain a constant distance from the central zone of the vehicle (to which the rods are connected). Taking this into account, a space can be defined for each actuator 8, 9, 10, wherein the space designates the limits within which the respective actuator moves during suspension of the wheel; this space is illustrated in FIG. 3B with hatched areas. In practice the space will be three-dimensional. Because the actuators of the first set 8, 9, 10 (which run to wheel 3) overlap with the actuators of the second set 8', 9', 10' (which run to wheel 4), the corresponding actuators of the different sets are mounted asymmetrically. The actuators of the first set are placed asymmetrically relative to the actuators of the second set such that the spaces defined for the actuators of the first set 8, 9, 10 have no overlap with spaces defined for actuators of the second set 8', 9', 10'. Because the spaces do not overlap, the one wheel 3 can be suspended independently of the other wheel 4 without actuators 8, 9, 10 of the one set colliding with the actuators of the other set.

Symmetry and asymmetry are envisaged here relative to a plane extending upward and in the travel direction of the vehicle and running through a centre (or centre of gravity) of the vehicle. It is noted in this context that a vehicle is typically manufactured as symmetrically as possible so as to balance the kinematic influences (so that the kinematic influences on the left-hand side of the vehicle are substantially the same as the kinematic influences on the right-hand side of the vehicle) and such that the weight is divided roughly equally between the left-hand side and the right-hand side of vehicle 1.

Corresponding actuators 8, 9, 10 can be placed asymmetrically by for instance placing actuator 8 in front of or behind actuator 8' (as seen in the travel direction of the vehicle). The actuators can alternatively be placed asymmetrically by for instance placing actuator 8 above or below actuator 8'. Because the spaces defining the movement of the actuators can take complex three-dimensional forms, combinations of the above examples can also be made in order to avoid overlap and approximate maximal symmetry. The actuators can alternatively be connected eccentrically to knuckle and vehicle such that, while the connecting points at the position of knuckle and vehicle do lie symmetrically, the actuators still cross over each other.

Asymmetrical placing of corresponding actuators is possible either by asymmetrical positioning thereof at frame 7 or asymmetrical placing thereof at knuckle 6, or preferably by a combination hereof. Each actuator is preferably connected to frame 7 via a rubber bushing, whereby the actuator can rotate freely relative to frame 7. Each actuator is preferably further connected via a rubber bushing to knuckle 6 so that the actuator can also rotate freely relative to knuckle 6. Through placing of the actuator between two such bushings, mainly forces will be transmitted to the actuator which are in line with the longitudinal direction of the actuator. The actuator can hereby be used optimally, i.e. to transfer forces in the longitudinal direction of the actuator.

Because of the overlap in the transverse direction of the actuators, at least some of the elements of the wheel suspension which secure left wheel 3 are connected to the right-hand half of vehicle 1, while at least some of the elements of the wheel suspension securing right wheel 4 are connected to the left-hand half of vehicle 1. This creates a lever which is greater than in conventional suspensions, whereby the wheels of the suspension according to the invention have more freedom of movement. Particularly the elements of the wheel suspension which secure the wheel in the transverse direction are connected in the above stated manner to vehicle 1.

Steering actuators 10 are preferably connected at the position of frame 7 to a steering element (not shown). This steering element can be connected in conventional manner to the steering of the vehicle, typically via a steering rod, for reciprocal movement subject to the angular position of the steering. A passive steering is obtained by connecting steering actuators 10 to the steering element. Passive is understood here to mean without electronic or hydraulic control of steering actuators 10. When steering actuators 10 are set in a predetermined position, and the steering element moves reciprocally, steering actuators 10 will hereby also co-displace reciprocally, whereby the steering positions of wheels 3 and 4 change correspondingly. The vehicle can in this way be steered in conventional manner.

In addition to a passive steering, an active steering can also be obtained in simple manner via the wheel suspension according to the invention. The active steering is then implemented by operating the steering actuators, for instance by retracting or extending the hydraulic or electromagnetic cylinder 10, so as to thus influence the steering position of the associated wheel. The advantage of active steering is that it can be implemented wheel by wheel (while passive steering will have the same influence on the two wheels 3, 4). A further advantage of active steering is that it can be applied digitally by a control module in order to perform predetermined algorithms and thus increase the stability of vehicle 1. Via this active steering new forms of skid control, brake control or four-wheel steering can be implemented. Braking of the vehicle can be obtained by giving a so-called towin. This means that the right wheel is steered to the left while the left wheel is steered to the right. An automatic braking is hereby achieved without braking the wheel itself via a conventional braking system. The suspension of the invention can in this way form a backup system for the braking system.

The wheel suspension according to the invention further allows an active camber control. The camber position of the wheel is determined by the angular position of the wheel relative to the longitudinal axis of the vehicle. The camber position determines the position of the tread of the tyre of the wheel relative to the ground surface. It will be apparent that, the more the tread of the tyre of the wheel runs parallel to the ground surface, the better the weight of vehicle 1 is distributed over the surface area of the wheel, and so the better the grip. The optimal camber position of the wheel can be influenced in practice by different causes/conditions and an example hereof is the suspension of the wheel, negotiation of a bend with the vehicle and the steering position of the wheel. When for instance a bend is taken at high speed, the tyre will deform and thereby no longer lie flat with its tread on the ground surface. The optimal camber position is defined as that position of the wheel in which the tread of the band of the wheel lies flat on the ground surface. Any deviation from or influencing of the optimal camber position of the wheel has a negative effect here on the grip of the wheel on the ground surface. Because the wheel suspension according to the invention has a lower arm 8 and an upper arm 9, and these arms are embodied as actuators, the camber position of each of the wheels can be individually adjusted by operating the respective lower and upper actuator 8, 9. The active camber control can be performed here by a control module, wherein predetermined algorithms are implemented which optionally take into account driving conditions such as driving speed and steering position of the wheel.

The vehicle preferably comprises a control module for controlling actuators 8, 9, 10 and optionally for controlling suspension strut 14. The control module is adapted in the first place here to control the track width of vehicle 1. The track width can be set manually or can be determined on the basis of predetermined algorithms, or a combination thereof. The control module can further be provided with logic or algorithms in order to optimize control of the vehicle. A wheel suspension can be so designed that in the narrow track position the maximal steering positions of the wheels is limited (whereby the vehicle has a large turning circle in the narrow track position). However, by at least partially extending the actuators 8, 9, 10 the wheels 3, 4 are given more space so that the maximum steering angle of the wheels increases and the turning circle becomes smaller. Such situations can be preprogrammed such that the control module controls the wheel suspension optimally. The control module can thus also apply active steering as well as active camber control. The control module can further be provided so as to improve the aerodynamics, for instance by reducing the track width at high speed so that the frontal surface area of the vehicle decreases.

Simulations have shown that actuators 8, 9, 10 are highly suitable for absorbing a lateral impact. The vehicle is preferably provided for this purpose with a lateral crash detection sensor which is suitable for detecting an imminent lateral impact and for sending a corresponding signal to the control module. When the control module receives such a signal, the control module will preferably fully extend actuators 8, 9, 10 so that the wheels come to lie in the wide track position. Not only does the vehicle have the greatest stability in the wide track position, a lateral impact can also be absorbed in actuators 8, 9, 10 such that the driver and/or passengers of vehicle 1 are relieved of the impact. The safety of a vehicle with a suspension according to the invention is hereby increased appreciably. Conventional vehicles are highly sensitive to lateral impacts because a lateral impact can hardly be absorbed. Extending the actuators according to the invention enables maximum absorption of the lateral impact by these actuators so that the effect of the impact on the body of vehicle 1 is minimal.

The skilled person will appreciate on the basis of the above description that wheel suspension can be embodied in different ways and on the basis of different principles. The invention is not limited here to the above described construction. The above described embodiments and the figures are purely illustrative and serve only to increase understanding of the invention. The invention is not therefore limited to the embodiments described herein, but is defined in the claims.

The invention claimed is:

1. A wheel suspension suitable for connection to a body of a vehicle and comprising a first and a second wheel which together define a track width and wherein, when the wheel suspension is connected to the vehicle, the first wheel is connected to the body via a first set of actuators and the second wheel is connected to the body via a second set of actuators such that by means of operating the actuators the track width is adjustable between a narrow track and a wide track, wherein the first set of actuators overlaps in a transverse direction of the vehicle with the second set of actuators, wherein each set of the first set of actuators and the second set of actuators comprises at least a front actuator and a rear actuator which extend substantially parallel and together determine a steering angle of the first and second wheel respectively, wherein each actuator of the first set of actuators and the second set of actuators is connected pivotally to the body at a respective connection point such that an independent vertical movement of the first and second wheel relative to the body of the vehicle by the wheel suspension is allowed by rotating the corresponding actuators around their respective connection point.

2. The wheel suspension as claimed in claim 1, wherein said each actuator of the first set of actuators and the second set of actuators is a linear actuator.

3. The wheel suspension as claimed in claim 1, wherein said each of the first set of actuators and the second set of actuators comprises at least a lower actuator and an upper actuator which extend substantially parallel, and together determine a camber position of the first and second wheel respectively, and which are preferably connected at a position of the wheel respectively in a zone below and above a wheel axle.

4. The wheel suspension as claimed in claim 1, wherein the actuators of the first set of actuators and the second set of actuators have a substantially equal length when they are placed in a same position.

5. The wheel suspension as claimed in claim 1, wherein a central plane is defined which extends upward and in a travel direction of the vehicle, and which said central plane runs through a center of gravity of the wheel suspension, wherein the first set of actuators and the second set of actuators are connected to the body asymmetrically relative to the central plane.

6. The wheel suspension as claimed in claim 1, wherein the suspension further comprises a suspension strut for each said wheel, which suspension strut is provided so as to control a vertical movement of the wheel relative to the body.

7. The wheel suspension as claimed in claim 1, wherein each of the actuators of the first set of actuators and the second set of actuators has a housing and an element slidable relative to the housing, and wherein the housings of the actuators overlap each other substantially completely in the transverse direction of the vehicle.

8. The wheel suspension as claimed in claim 1, wherein the connection point comprises a ball joint.

9. The wheel suspension as claimed in claim 1, wherein said each actuator of the first set of actuators is connected pivotally at a position of the first wheel to a first knuckle, and wherein each actuator of the second set of actuators is connected pivotally at a position of the second wheel to a second knuckle.

10. The wheel suspension as claimed in claim 9, wherein each of said first and second knuckles is connected pivotally to a first end of a rod, and wherein a second end of the rod is provided so as to be connected pivotally to a central zone of the vehicle so that forces acting on the first and second knuckles in travel direction of the vehicle are substantially absorbed by the rod.

11. The wheel suspension as claimed in claim 1, wherein a control module is further provided which controls the actuators on a basis of steering input and speed of the vehicle.

12. The wheel suspension as claimed in claim 11, wherein the control module is provided so as to be connected to a lateral crash detection sensor of the vehicle, and wherein the control module controls the actuators to the wide track position on a basis of the lateral crash detection sensor.

* * * * *